Figure 1:
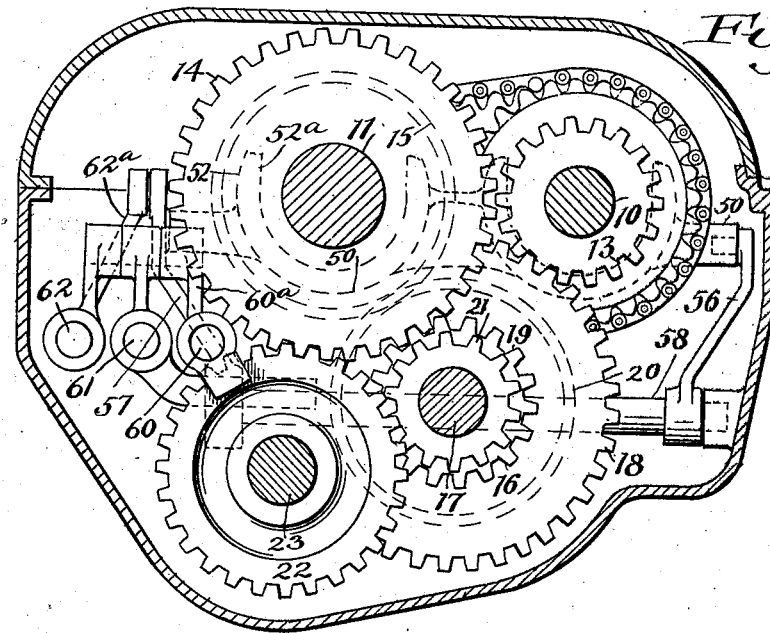

A. P. BRUSH.
SPEED GEARING FOR AUTOMOBILES.
APPLICATION FILED DEC. 19, 1913.

1,179,069.

Patented Apr. 11, 1916.
2 SHEETS—SHEET 1.

Witnesses
E. B. Gilchrist
L. J. Porter

Inventor
Alanson P. Brush
by Thurston & Kwis
Attorneys

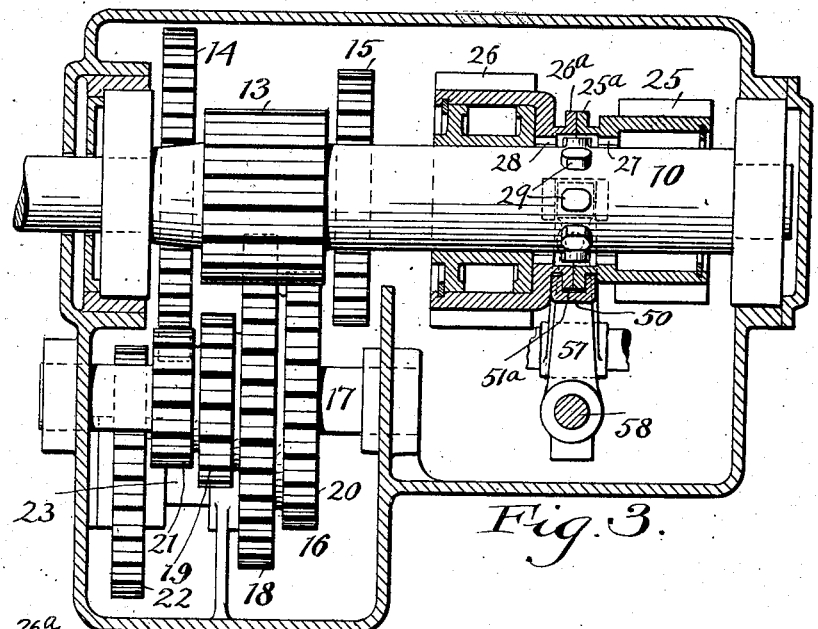
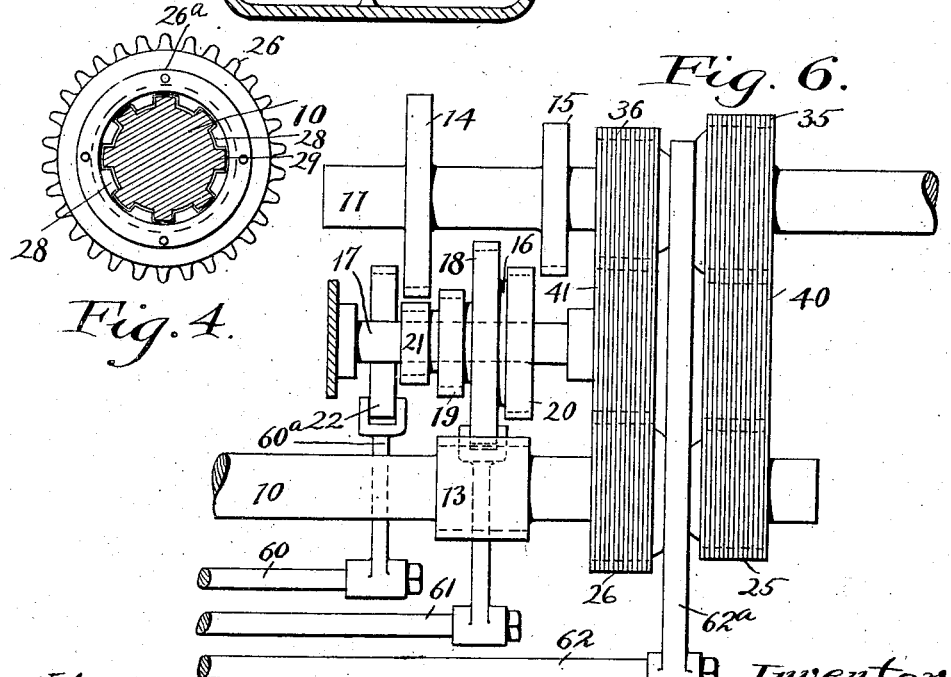

UNITED STATES PATENT OFFICE.

ALANSON P. BRUSH, OF DETROIT, MICHIGAN.

SPEED-GEARING FOR AUTOMOBILES.

1,179,069.  Specification of Letters Patent.  Patented Apr. 11, 1916.

Application filed December 19, 1913. Serial No. 807,577.

*To all whom it may concern:*

Be it known that I, ALANSON P. BRUSH, a citizen of the United States, residing at Detroit, in the county of Wayne and State of Michigan, have invented a certain new and useful Improvement in Speed-Gearing for Automobiles, of which the following is a full, clear, and exact description.

The typical power transmitting mechanism in general use on automobiles includes means for bringing about several speed ratios between the motor shaft and the driving road wheels of the car. These means include, first, a beveled gear which is a part of the differential mechanism in the rear axle, and a driving pinion therefor. Second, the so-called "transmission mechanism" which embodies several speed reducing trains of gears, which may be rendered operative at will, for turning said beveled pinion backward, or forward at several speeds relative to the motor shaft; and other means by which to drive said beveled pinion at the same rate as the motor shaft, without recourse to a gear train. This latter mechanism is called the direct drive; and it is used preferentially by most automobile drivers for about 90 per cent. of the car mileage, because hereby there is eliminated the noise (gear grind) incident to transmitting power through gear trains, and likewise it enables the car to run at satisfactory speeds while the motor is running at relatively low speeds.

There are many specific variations in the details of the various constructions in use, but at best they are all compromises; and the variations are due to the conceptions of the individual designers as to what particular compromise will permit the greatest use of the direct drive, in view of the road conditions which the car is expected to encounter.

If the bevel gear speed reduction at the rear axle, before referred to, is made low enough to allow a maximum percentage of driving on the direct, the beveled pinion must either be made so small that it will be short lived, or the beveled gear must be made so large that the differential mechanism will be cumbersome and expensive; additionally, the motor will have to run at needlessly high speed when the road conditions and other circumstances justify high car speed; and, obviously, high motor speed is objectionable not only from the standpoint of needless wear on and noise in the motor, but because also of the corresponding high rate of fuel consumption. If, on the other hand, the beveled gear and pinion are so proportioned as to lessen the speed reduction, the percentage of driving which can be done on the direct is correspondingly reduced.

As a result of experience with the typical constructions above referred to, automobile designers are coming to realize that there is no practical single speed-reducing mechanism which can give satisfactory results for a sufficiently large percentage of driving conditions, as distinguished from emergency conditions. Many attempts have been made to satisfactorily solve the problem which experience has shown to exist, as above set forth. In some cases a fourth speed closely approximating that produced by the direct, has been provided for in the so-called transmission mechanism. In some cases this fourth speed is slightly higher, and in some it is slightly lower than the direct; but in both cases this fourth speed is produced through a gear train which is objectionable for reasons stated. Others have attempted to solve this problem by providing two differently proportioned pairs of beveled gears and pinions at the rear axle, associated with means for rendering either pair operative. Whether this will be a practical solution of the problem remains to be seen; but in any event it is obviously an expensive solution and is objectionable for that reason.

The present invention is an attempt to solve that problem by means of inexpensive transmission mechanism, which occupies small space, and may be confined as usual in a casing, by means of which one may produce the usual two low emergency ratios ahead and one emergency reverse ratio, and may additionally produce two continuous service driving ratios, one an overstep and one an under step; that is to say, one slightly greater and one slightly less than the speed of the motor shaft,—by means which are silent and of extremely high efficiency. The combination of parts by which these obviously desirable results can be attained constitutes the present invention, as shown in the drawing, and hereinafter described and definitely pointed out in the appended claims.

Figure 2:
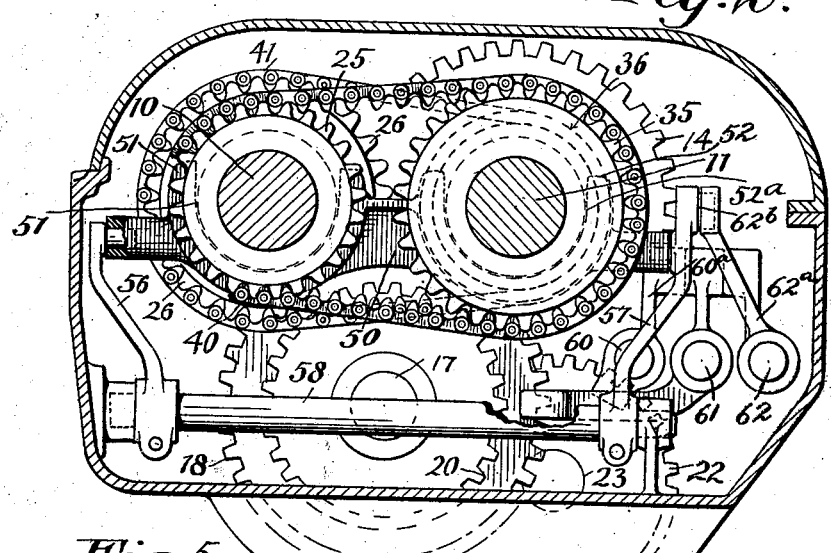
Figure 5:
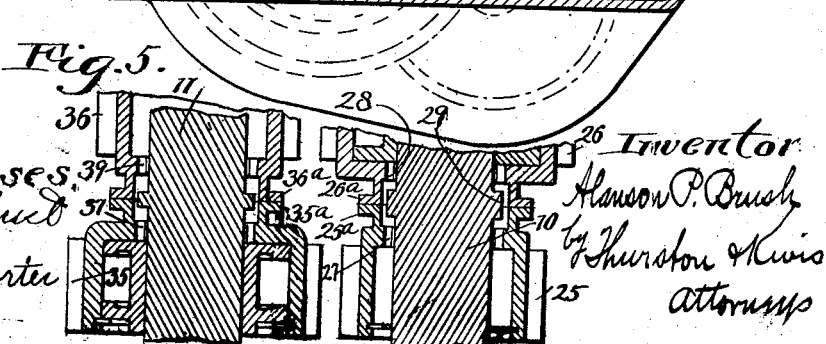

In the drawing, Figure 1 is a view of the mechanism from the front end thereof, when the front end of the transmission case has been cut away. Fig. 2 is a rear elevation when the rear end of the case has been cut away. Fig. 3 is a side elevation of the front part of the mechanism when the case is broken away, and the rear part of this view is a vertical section through the center of the driving shift. Fig. 4 is a sectional end view of the driving shaft, and one of the sprockets thereon. Fig. 5 is a plan view of those parts of the two shafts on which are the teeth for clutching the sprockets thereto; and Fig. 6 is a diagrammatic representation of the invention.

Two parallel disalined shafts, viz., the driving shaft 10 and the driven shaft 11 are mounted in the transmission case 12. The driving shaft projects out through the front end of the case in order that it may be connected, in the usual or any suitable manner with the crank shaft of the motor; while the driven shaft projects out through the rear end of the case in order that it may be connected in the usual or any suitable manner with the driving pinion of the differential mechanism.

A wide gear 13 is fixed to the driving shaft; and two gears 14 and 15, of different diameters, are fixed to the driven shaft. Intermediately placed is a gear-carrying sleeve 16 which is mounted on a fixed cylindrical spindle 17, so as to be capable of rotating and of moving endwise thereon. This sleeve carries several gears, viz. the gear 18 which is always in mesh with the wide gear 13, irrespective of the position of the sleeve, wherefore the sleeve always rotates when the driven shaft rotates; a gear 19 which may be caused to mesh with gear 14 by the movement of the gear sleeve 16 from its neutral position, as shown, toward the front end of the case; a gear 20 which may be caused to mesh with gear 15 by the movement of said gear sleeve rearward from its neutral position; and a gear 21, which, when said gear sleeve is in the neutral position is in the same transverse plane with gear 14, but is of such small diameter that it cannot mesh therewith.

A reversing gear 22 is rotatably mounted on a fixed spindle 23, and normally occupies the position shown in front of but out of mesh with gears 14 and 21. At least it must be out of mesh with gear 14, but may be in mesh with gear 21, if desired. By moving this reverse gear rearward, it will slip into mesh with both of the gears 14 and 21, and thereby become part of a gear train which includes said gears, as well as the gears 13 and 18,—through which gear train the driven shaft is turned by the driving shaft at relatively slow speed and in the reverse direction. When the gears 14 and 19 are caused to mesh by the endwise forward movement of the gear sleeve 16, they, together with the gears 13 and 18, constitute a gear train through which the driving shaft turns the driven shaft at relatively slow speed, but in the same direction. When, by the rearward endwise movement of the sleeve 16, the gear 20 is slipped into mesh with gear 15, these two gears, together with the gears 13 and 18 constitute a gear train through which the driving shaft turns the driven shaft in the same direction and at a rate which, although slower than that of the driving shaft, is nevertheless faster than the rate at which it turns when power is being transmitted to it by the gear train last mentioned. These several gear trains, together with suitable means for moving the gear sleeve 16, and the reversing gear 22 endwise, furnish means for securing the necessary emergency drives,—that is to say, for backing the car, for starting the car, and for propelling it forward at such a speed ratio that it can easily negotiate steep hills or heavy roads.

Loosely mounted upon the driving shaft are two sprocket wheels 25 and 26. Loosely mounted on the driven shaft are two other sprockets 35 and 36. A silent chain belt 40 runs over the pair of sprockets 25, 35 and another similar chain belt 41 runs over the pair of sprockets 26—36. In the preferred construction, as shown, the two sprocket wheels 25, 36 are of the same size, i. e. have the same number of teeth, and the two sprocket wheels 26—35 are of the same size, i. e. have the same number of teeth. Because of this similarity in the size of the sprocket wheels, the two chain belts 40, 41 may be of the same length. When one pair of sprocket wheels 25—35 are connected with their respective shafts, the driven shaft will turn in the same direction as the driving shaft, but at a slightly slower rate, and in that event both shafts will rotate within the other two sprockets without necessarily turning them. When the two sprockets 26—36 are connected with their respective shafts, the driven shaft will be turned in the same direction as the driving shaft, but at a slightly higher speed; and when this connection has been made the two shafts will rotate within the other two sprockets without necessarily turning them. In order to clutch or connect these sprocket wheels properly with their respective shafts, both sprockets on the driving shaft are provided in their adjacent ends with internal gear teeth 27 and 28, respectively, and on the shaft are teeth 29 which, when the sprockets are in their neutral position are in a space between the adjacent ends of these said internal gear teeth. The two sprocket wheels 35—36 are similarly provided in their adjacent ends with internal gear teeth 37—39, and the driven shaft is provided with teeth which normally occupy positions between but out of contact with the adjacent ends of the said internal gear teeth. As a minor characteristic which, however, makes for the efficiency of the device, the teeth on the driven shaft are shorter than the teeth on the driving shaft,—that is shorter lengthwise of the shafts, as shown in Fig. 5. Means, to be presently explained, are provided by which to move all four of these sprockets lengthwise of their shafts equally and in the same direction. If they are all moved rearward, for example, the internal gear teeth of the sprocket wheel 25 will first slip over the teeth on the driving shaft, after which said sprocket wheel and chain will, of necessity, move in unison with said driving shaft. Immediately after said sprocket and chain have started into motion, the internal gear teeth of the sprocket 35 will slip over the teeth on the driven shaft, and thereafter the driven shaft will turn in unison with said sprocket. By thus making the two sets of teeth of different length, as stated, the inertia of the two sprocket wheels and chain will first be overcome by their connection with the driving shaft, and when they are in motion, the driven shaft will be picked up and its inertia overcome with less strain than if both sprockets were connected with their respective shafts at the same time.

If all four sprockets be moved forward, the internal gear teeth of the two sprockets 26—36 will slip over the teeth on the two shafts, but will not do this simultaneously but successively, as before explained.

In order to facilitate the simultaneous movement of the four sprockets and chains carried thereby, the ends of the two sprockets on the driving shaft and the ends of the two sprockets on the driven shaft are in substantial contact. These touching ends are provided with external annular flanges 25ª, 26ª, 35ª and 36ª. There is a double yoke 50, that is to say, a yoke having two substantially semi-circular arms 51, 52; and this is pivoted at its ends on alined pivots to two upstanding arms 56, 57, fixed to a rock shaft 58. In the concave surface of each of these two curved arms is a groove which receives the flanges of the two associated sprocket wheels; that is to say, the flanges 25ª, 26ª, enter the groove 51ª in the curved arm 51, and the two flanges 35ª and 36ª enter the groove 52ª in the curved arm 52. By this simple means the sprockets are held in the required relation to one another, and are simultaneously moved lengthwise of the two shafts with the results above pointed out.

It will be observed that when either of the emergency gear trains first referred to are rendered operative to bring about either of the three emergency speed ratios, the two shafts may be rotated within the four sprockets without turning them. When either pair of sprockets is connected with the two shafts the other pair of sprockets need not turn; but at all times the gear sleeve 16 will turn. The turning of this sleeve is not, however, a matter of importance, since it is doing no work unless some emergency gear train is in service, and is therefore subjected to no strain and will therefore be practically noiseless.

As before stated, the two chain belts and their associated sprockets provide an overstep and an understep transmitting mechanism. The relative sizes of the sprockets are optional, and may be such as will cause the driven shaft to be driven at any desired slower rate, or any desired faster rate than the driving shaft. When the size of the sprocket wheels bear the relation to each other above described, the over step and under step rates at which the driven shaft turns, bear reciprocal relations to the speed of the driving shaft. Likewise this construction produces a desirable interchangeability of parts,—that is to say, in the organization of the device there is only required two sizes of sprocket wheels and one length of chain belt.

Any suitable means for selectively moving the gear sleeve 16, and the reversing gear 22, or the four sprocket wheels referred to may be employed, and there is quite a variety of such mechanisms in common use in the art. For example, there may be three endwise movable rods 60, 61 and 62. The rod 60 may carry a forked arm 60ª which engages with the sides of the reversing gear 22. The rod 61 may carry a forked arm which engages with the sides of the gear 18, and thereby the gear sleeve 16 may be moved. The third rod 62 may have an arm 62ª which is provided with a stub 62ᵇ which projects into a slot in the arm 57. It is not necessary here to describe any means for selectively moving these three rods endwise. So far as the present invention is concerned they might be moved by hand, but, as a matter of fact, there is a wide variety of mechanisms known in this art through which the driver of a car may selectively move any one of these rods in either direction to bring about any of the results which will follow the movement of the reversing gear 22, the gear sleeve 16, or the sprockets and their chain belts, as above described.

Having described my invention, I claim:

1. In speed gearing, the combination of two parallel but disalined shafts, viz. a driving and a driven shaft, gears fixed to said shafts, an intermediate rotatable endwise movable gear sleeve carrying a plurality of gears for meshing with gears on the driving and driven shafts, two sprocket wheels of different sizes loosely mounted on the driving shaft, two coöperating sprocket wheels of different sizes loosely mounted on the driven shaft, two chain belts each cooperating with a pair of sprocket wheels, viz. one sprocket wheel on each shaft, and mechanisms by which to selectively move said gear sleeve or to connect either pair of chain connected sprocket wheels with said shafts.

2. In speed gearing, the combination of a gear case, two parallel but disalined shafts, viz. a driving and a driven shaft which are respectively mounted in said gear case and project one from the front end and the other from the rear end of said case, gears fixed to said two shafts, a non-rotatable shaft within said casing, a gear sleeve rotatively mounted and movable endwise upon said fixed shaft and carrying a plurality of gears for meshing with the gears on the driving and driven shafts, two sprocket wheels loosely mounted on the driving shaft within said gear case, two sprocket wheels loosely mounted on the driven shaft within said gear case, two chain belts each running over a pair of sprockets, viz. one on each shaft, and mechanisms by which to selectively move said gear carrying sleeve or to connect either pair of chain connected sprockets with the two shafts, as desired.

3. In speed gearing, the combination of two parallel but disalined shafts, viz. a driving and a driven shaft, a wide gear on one of said shafts, a plurality of gears of different sizes fixed to the other shaft, an endwise movable rotatable gear sleeve carrying one gear which is in permanent mesh with said wide gear, and carrying other gears adapted to mesh with different gears on the other shaft, two sprocket wheels loosely mounted on one shaft, two other sprocket wheels loosely mounted on the other shaft, two chain belts each running over a pair of sprocket wheels, viz. one sprocket on each shaft, clutch mechanisms by which to connect either pair of sprocket wheels with said shafts, and mechanisms by which to selectively move the gear sleeve to cause the intermeshing of the desired gears or to clutch either pair of sprocket wheels to the two shafts on which they are mounted.

In testimony whereof, I hereunto affix my signature in the presence of two witnesses.

ALANSON P. BRUSH.

Witnesses:
E. B. GILCHRIST,
L. I. PORTER.